(12) United States Patent
Pham et al.

(10) Patent No.: US 11,773,843 B2
(45) Date of Patent: Oct. 3, 2023

(54) INTEGRAL RECIPROCATING PUMP STRUCTURE SUPPORTING SPACER SECTION

(71) Applicant: Schlumberger Technology Corporation, Sugar Land, TX (US)

(72) Inventors: Hau Nguyen-Phuc Pham, Houston, TX (US); Rod Shampine, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 16/895,107

(22) Filed: Jun. 8, 2020

(65) Prior Publication Data

US 2020/0386221 A1 Dec. 10, 2020

Related U.S. Application Data

(60) Provisional application No. 62/858,762, filed on Jun. 7, 2019.

(51) Int. Cl.
*F04B 53/16* (2006.01)
*F04B 37/12* (2006.01)
(Continued)

(52) U.S. Cl.
CPC .............. *F04B 53/16* (2013.01); *F04B 37/12* (2013.01); *F04B 39/128* (2013.01); *F04B 15/02* (2013.01);
(Continued)

(58) Field of Classification Search
CPC ........ F04B 53/16; F04B 39/128; F04B 37/12; F04B 39/12; F04B 53/14; F04B 53/22;
(Continued)

(56) References Cited

U.S. PATENT DOCUMENTS 7,172,175 B2   2/2007   Vicars
7,335,002 B2   2/2008   Vicars
(Continued)

FOREIGN PATENT DOCUMENTS

CN   106337804 A   1/2017
WO   9950578       10/1999
(Continued)

OTHER PUBLICATIONS

Office Action issued in U.S. Appl. No. 16/895,194 dated Jan. 24, 2022, 21 pages.
(Continued)

*Primary Examiner* — Kenneth J Hansen
*Assistant Examiner* — David N Brandt
(74) *Attorney, Agent, or Firm* — Jeffrey D. Frantz

(57) ABSTRACT

A reciprocating pump having a power end, a fluid end, and a spacer section interposing the power and fluid ends. The power end includes a structural support frame having structural members that are each a discrete, unitary member. Each structural member forms a portion of a crankcase frame, a portion of a crosshead support frame, and a portion of a support base. The support base portion extends beneath the crosshead support frame and the spacer section.

19 Claims, 13 Drawing Sheets

(51) Int. Cl.
  *F04B 39/12* (2006.01)
  *F16J 1/14* (2006.01)
  *F04B 15/02* (2006.01)
  *F04B 53/14* (2006.01)
  *F04B 53/22* (2006.01)

(52) U.S. Cl.
  CPC ............. *F04B 53/147* (2013.01); *F04B 53/22* (2013.01); *F16J 1/14* (2013.01)

(58) Field of Classification Search
  CPC . F04B 53/147; F04B 15/02; F16J 1/14; F01B 1/12
  See application file for complete search history.

(56) References Cited

U.S. PATENT DOCUMENTS

| | | | |
|---|---|---|---|
| 7,341,435 | B2 | 3/2008 | Vicars |
| 8,276,918 | B1 | 10/2012 | Gilstad et al. |
| 8,662,864 | B2 | 3/2014 | Bayyouk et al. |
| 8,662,865 | B2 | 3/2014 | Bayyouk et al. |
| 9,435,333 | B2 | 9/2016 | McCoy et al. |
| 9,435,454 | B2 | 9/2016 | Blume |
| 9,500,195 | B2 | 11/2016 | Blume |
| 9,605,767 | B2 | 3/2017 | Chhabra |
| 9,989,053 | B2 | 6/2018 | Add et al. |
| 10,087,992 | B2 | 10/2018 | Bayyouk et al. |
| 10,871,227 | B1* | 12/2020 | Belshan ..................... F16J 1/08 |
| 2008/0006148 | A1 | 1/2008 | McKelroy |
| 2012/0234539 | A1 | 9/2012 | Brunet et al. |
| 2015/0132157 | A1* | 5/2015 | Whaley .................. F04B 47/12 92/172 |
| 2016/0025082 | A1* | 1/2016 | Byrne ..................... F04B 53/22 29/888.03 |
| 2016/0177945 | A1 | 6/2016 | Byrne et al. |
| 2016/0369792 | A1 | 12/2016 | Wagner |
| 2017/0159655 | A1 | 6/2017 | Morreale et al. |
| 2017/0218951 | A1 | 8/2017 | Graham et al. |
| 2017/0292513 | A1* | 10/2017 | Haddad ................. F04B 49/065 |
| 2017/0370524 | A1 | 12/2017 | Wagner |
| 2018/0040226 | A1 | 2/2018 | Zhang et al. |
| 2018/0087503 | A1 | 3/2018 | Chunn et al. |
| 2018/0135621 | A1* | 5/2018 | Blume ..................... F04B 53/10 |
| 2018/0156212 | A1 | 6/2018 | Ballario |
| 2018/0216613 | A1 | 8/2018 | Beisel |
| 2018/0230977 | A1 | 8/2018 | Skurdalsvold et al. |
| 2018/0291892 | A1 | 10/2018 | Vicars |
| 2019/0011051 | A1 | 1/2019 | Yeung |
| 2019/0055939 | A1 | 2/2019 | Buckley |
| 2019/0136840 | A1* | 5/2019 | Kumar .................. F04B 1/0404 |

FOREIGN PATENT DOCUMENTS

| | | |
|---|---|---|
| WO | 2015077252 A1 | 5/2015 |
| WO | 2017039701 A1 | 3/2017 |
| WO | 2018052398 A1 | 3/2018 |
| WO | 2018075055 A1 | 4/2018 |
| WO | 2019046680 A1 | 3/2019 |

OTHER PUBLICATIONS

Office Action issued in U.S. Appl. No. 16/895,194 dated Mar. 3, 2023, 18 pages.

\* cited by examiner

INTEGRAL RECIPROCATING PUMP STRUCTURE SUPPORTING SPACER SECTION

RELATED APPLICATION

This application claims priority to and the benefit of a U.S. Provisional Application having Ser. No. 62/858,762, filed 7 Jun. 2019, which is incorporated by reference herein.

BACKGROUND OF THE DISCLOSURE

High-volume, high-pressure pumps are utilized at wellsites for a variety of pumping operations. Such operations may include drilling, cementing, acidizing, water jet cutting, hydraulic fracturing, and other wellsite operations. For example, one or more positive displacement reciprocating pumps may be utilized to pressurize low-pressure fluid from one or more mixers, blenders, and/or other fluid sources for injection into a well.

Each reciprocating pump may comprise a plurality of reciprocating, fluid-displacing members (e.g., pistons, plungers, diaphragms, etc.) driven by a crankshaft into and out of a fluid-pressurizing chamber to alternatingly draw in, pressurize, and expel fluid from the fluid-pressurizing chamber. Each reciprocating member discharges the fluid from its fluid-pressurizing chamber in an oscillating manner, resulting in suction and discharge valves of the pump alternatingly opening and closing during pumping operations.

Success of pumping operations at a wellsite may be affected by many factors, including efficiency, failure rates, and safety related to operation of the reciprocating pumps. Vibration and repetitive high forces and pressures generated by the reciprocating pumps may cause mechanical fatigue, wear, and/or other damage to the pumps, which may decrease pumping flow rates, quality of downhole operations, and/or operational efficiency.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus including a reciprocating pump that includes a power end, a fluid end, and a spacer section interposing the power and fluid ends. The power end includes a structural support frame that includes structural members that are each a discrete, unitary member. Each structural member forms a portion of a crankcase frame, a portion of a crosshead support frame, and a portion of a support base. The support base portion extends beneath the crosshead support frame and the spacer section.

The present disclosure also introduces an apparatus including a reciprocating pump that includes a power end, a fluid end, and a spacer section interposing the power and fluid ends. The power end includes a crankcase portion that includes a crankcase frame and crankshafts each extending from the crankcase frame. The power end also includes a crosshead portion that includes a crosshead support frame and crossheads each pivotably connected with a corresponding one of the crankshafts. The power end also includes a structural support frame that includes structural members that are each a discrete, unitary member. Each structural member forms a portion of the crankcase frame, a portion of the crosshead support frame, and a portion of a support base. The support base portion extends horizontally below the entire crosshead support portion and the spacer frame.

The present disclosure also introduces an apparatus including a reciprocating pump that includes a power end, a fluid end, and a spacer section interposing the power and fluid ends. The power end includes a crankcase portion that includes a crankcase frame and crankshafts each protruding from the crankcase frame. The power end also includes a crosshead portion that includes a crosshead support frame and crossheads each pivotably connected with an end of a corresponding one of the crankshafts protruding from the crankcase frame. The power end also includes a structural support frame that includes first structural members and second structural members. The first structural members are each a discrete, unitary member. Each first structural member forms a portion of the crankcase frame, a portion of the crosshead support frame, and a portion of a support base. The support base portion extends horizontally below the entire crosshead support portion and the spacer frame. The spacer section is fastened to or otherwise vertically supported by the support base. The second structural members are each a discrete, unitary member. Each second structural member forms a portion of the crankcase frame and a portion of the crosshead support frame but not the support base.

The present disclosure also introduces an apparatus including a reciprocating pump having a structural support frame, a crankshaft, and multiple crossheads operatively connected with the crankshaft. The structural support frame includes a crankshaft support portion and a crosshead support portion. The crankshaft is supported by the crankshaft support portion. The crossheads are supported by the crosshead support portion. The crankshaft support portion and the crosshead support portion are integrally formed.

The present disclosure also introduces an apparatus including a reciprocating pump having a structural support frame, a crankshaft, and multiple crossheads operatively connected with the crankshaft. The structural support frame includes a crankshaft support portion, a crosshead support portion, and multiple structural support members each including a segment of each of the crankshaft support portion and crosshead support portion. Each structural support member is integrally formed. The crankshaft is supported by the crankshaft support portion. The crossheads are supported by the crosshead support portion.

The present disclosure also introduces an apparatus including a reciprocating pump having a structural support frame, a crankshaft, multiple crossheads operatively connected with the crankshaft, a fluid end, and a spacer frame. The structural support frame includes a crankshaft support portion, a crosshead support portion, a support base to connect the pump to a base structure, and multiple structural support members each including a segment of each of the crankshaft support portion and the crosshead support portion. At least two of the structural support members further comprise a segment of the support base. Each structural support member is integrally formed. The crankshaft is supported by the crankshaft support portion. The crossheads are supported by the crosshead support portion. The spacer frame is disposed between the fluid end and the structural support frame and is supported by the support base.

These and additional aspects of the present disclosure are set forth in the description that follows, and/or may be learned by a person having ordinary skill in the art by reading the materials herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
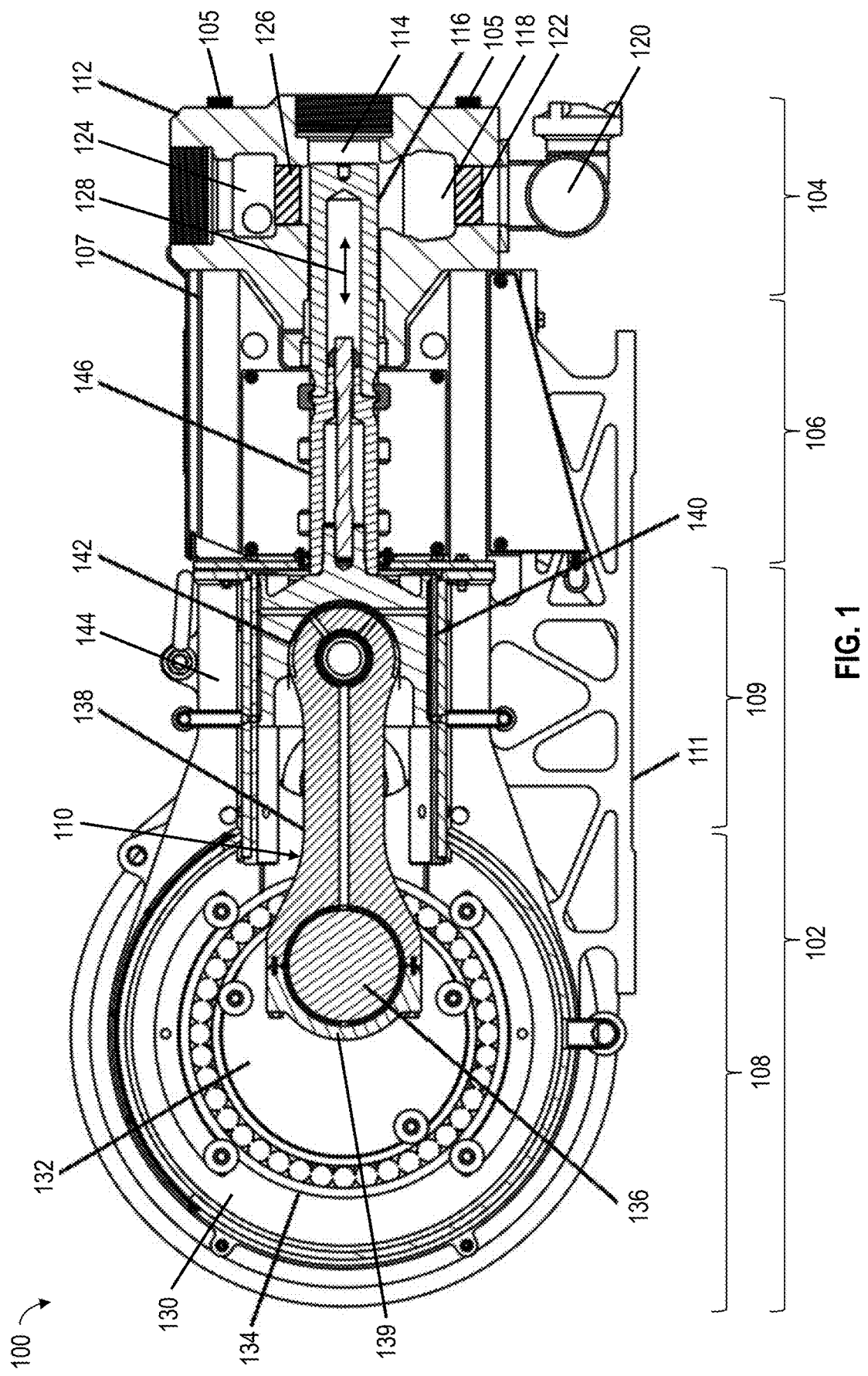
FIG. 1 is a sectional side view of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

The present disclosure is directed or otherwise related to structure and operation of a positive displacement reciprocating pump. The pump may be utilized or otherwise implemented for pumping a fluid at an oil and gas wellsite, such as for pumping a fluid into a well. For example, a pump according to one or more aspects of the present disclosure may be utilized or otherwise implemented in association with a well construction system (e.g., a drilling rig) to pump a drilling fluid through a drill string during well drilling operations. A pump according to one or more aspects of the present disclosure may also or instead be utilized or otherwise implemented in association with a well fracturing system to pump a fracturing fluid into a well during well fracturing operations. A pump according to one or more aspects of the present disclosure may also or instead be utilized or otherwise implemented in association with a well cementing system to pump a cement slurry into a well during casing cementing operations. However, a pump according to one or more aspects of the present disclosure may also or instead be utilized or otherwise implemented for performing other pumping operations at an oil and gas wellsite and/or other worksites. For example, a pump according to one or more aspects of the present disclosure may be utilized or otherwise implemented for performing acidizing, chemical injecting, and/or water jet cutting operations. Furthermore, a pump according to one or more aspects of the present disclosure may be utilized or otherwise implemented at mining sites, building construction sites, and/or other work sites at which fluids are pumped at high volumetric rates and/or pressures.

FIG. 1 is a sectional side of at least a portion of an example implementation of a positive displacement reciprocating pump 100 according to one or more aspects of the present disclosure. The pump 100 comprises a power section 102 operatively connected with and operable to actuate a fluid section 104 (e.g., fluid end). The power section 102 and the fluid section 104 may be connected via a spacer section 106 comprising a spacer frame 107. A plurality of tie-rods 105 may extend between the power and fluid sections 102, 104 through the spacer section 106 to connect the power and fluid sections 102, 104. The power section 102 may comprise a crankcase 108 operatively connected with a prime mover (e.g., engine, electric motor, etc.) (not shown) and a crosshead section 109 housing a plurality of crosshead assemblies 110. The crankcase 108 may be operable to transfer torque from the prime mover to the crosshead assemblies 110, which transform and transmit torque from the crankcase 108 to reciprocating linear forces causing pumping operation to be performed by the fluid section 104.

The fluid section 104 may comprise a pump housing 112 having a plurality of fluid-pressurizing chambers 114. One end of each fluid-pressurizing chamber 114 may contain a reciprocating, fluid-displacing member 116 slidably disposed therein and operable to displace a fluid within the corresponding fluid-pressurizing chamber 114. Although the fluid-displacing member 116 is depicted as a plunger, the fluid-displacing member 116 may instead be implemented as a piston, diaphragm, or other reciprocating, fluid-displacing member.

Each fluid-pressurizing chamber 114 comprises or is fluidly connected with a corresponding fluid inlet cavity 118 configured for communicating fluid from a common fluid inlet 120 (e.g., inlet manifold, suction manifold) into the fluid-pressurizing chamber 114. An inlet (i.e., suction) valve 122 may selectively fluidly isolate each fluid-pressurizing chamber 114 from the fluid inlet 120 to selectively control fluid flow from the fluid inlet 120 into each fluid-pressurizing chamber 114. Each inlet valve 122 may be disposed within a corresponding fluid inlet cavity 118 or otherwise between each fluid inlet cavity 118 and the corresponding fluid-pressurizing chamber 114. Each inlet valve 122 may be biased toward a closed-flow position by a spring and/or other biasing means (not shown). Each inlet valve 122 may be actuated to an open-flow position by a predetermined differential pressure between the corresponding fluid-pressurizing chamber 114 and the fluid inlet 120.

Each fluid-pressurizing chamber 114 may be fluidly connected with a common fluid outlet 124 (e.g., outlet manifold, discharge manifold). The fluid outlet 124 may be or comprise a fluid cavity extending through the pump housing 112 transverse to the fluid chambers 114. An outlet (i.e., discharge) valve 126 may selectively fluidly isolate each fluid-pressurizing chamber 114 from the fluid outlet 124 to selectively control fluid flow from each fluid-pressurizing chamber 114 into the fluid outlet 124. Each outlet valve 126 may be disposed within the fluid outlet 124 or otherwise between each fluid-pressurizing chamber 114 and the fluid outlet 124. Each outlet valve 126 may be biased toward a closed-flow position by a spring and/or other biasing means (not shown). Each outlet valve 126 may be actuated to an open-flow position by a predetermined differential pressure between the corresponding fluid-pressurizing chamber 114 and the fluid outlet 124.

During pumping operations, portions of the power section 102 may rotate in a manner that generates a reciprocating, linear motion to longitudinally oscillate, reciprocate, or otherwise move each fluid-displacing member 116 within the corresponding fluid-pressurizing chamber 114, as indicated by arrows 128. Each fluid-displacing member 116 alternatingly decreases and increases pressure within each chamber 114, thereby alternatingly receiving (e.g., drawing) fluid into and discharging (e.g., displacing) fluid out of each fluid-pressurizing chamber 114.

The crankcase 108 may comprise a crankcase frame 130, a crankshaft 132, and rotational bearings 134 supporting the crankshaft 132 in position within the crankcase frame 130. The prime mover may be operatively connected with (perhaps indirectly) and drive or otherwise rotate the crankshaft 132. The crankshaft 132 may comprise a plurality of crankpins 136 (e.g., offset journals) radially offset from the central axis of the crankshaft 132.

The crosshead assemblies 110 may be utilized to transform and transmit the rotational motion of the crankshaft 132 to a reciprocating, linear motion of the fluid-displacing members 116. For example, each crosshead assembly 110 may comprise a connecting rod 138 pivotably (e.g., rotatably) coupled with a corresponding crankpin 136 at one end and with a crosshead 140 of the crosshead assembly 110 at an opposing end. An end cap or C-clamp 139 may pivotably couple the connecting rod 138 to the crankpin 136. Each connecting rod 138 may be pivotably coupled with a corresponding crosshead 140 via a wristpin joint 142. The crosshead section 109 may further comprise a crosshead support frame 144 (i.e., crosshead guide support frame) configured to support and guide sliding motion of each crosshead 140. During pumping operations, side walls and upper and lower friction pads of the crosshead support frame 144 may guide or otherwise permit horizontal motion of each crosshead 140 and prevent or inhibit vertical motion of each crosshead 140. The crankcase frame 130 and the crosshead support frame 144 may be integrally formed or connected. Each crosshead 140 may be coupled with the fluid-displacing member 116 via a connecting rod 146 (e.g., pony rod). Each connecting rod 146 may be coupled with a corresponding crosshead 140 via a threaded connection and with a corresponding fluid-displacing member 116 via a flexible connection. The tie-rods 105 may extend through the spacer frame 107 between the crosshead support frame 144 and the pump housing 112 to connect the power and fluid sections 102, 104.

A support base 111 may be fixedly connected with the crankcase frame 130 and the crosshead support frame 144. The support base 111 may be integrally formed or connected with the crankcase frame 130 and with the crosshead support frame 144. The support base 111 may extend along (e.g., underneath) and be fixedly connected (e.g., fastened) with a spacer frame 107. The support base 111 may structurally reinforce the crankcase frame 130, the crosshead support frame 144, and the spacer frame 107. The support base 111 may prevent or inhibit transfer of torque and/or linear forces and, thus, prevent or inhibit relative movement between the crankcase frame 130, the crosshead support frame 144, the spacer frame 107, and the fluid section 104. The support base 111 may be fixedly coupled to a base structure (not shown), such as a skid or mobile trailer, to fixedly connect the pump 100 to the base structure.

The pump 100 may be implemented as a triplex pump, which has three fluid-pressurizing chambers 114 and three fluid-displacing members 116. The pump 100 may instead be implemented as a quintuplex pump having five fluid-pressurizing chambers 114 and five fluid-displacing members 116. The pump 100 may instead be implemented as a multiplex pump comprising other quantities of fluid-pressurizing chambers 114 and fluid-displacing members 116.

Conventional positive displacement reciprocating pumps (not shown) have separate structural components (e.g., a crankcase, a crosshead guide support, a spacer frame, a fluid end) connected in series using fully-threaded tie-rods extending through the structural components. The crankcase and the spacer frame nearest the fluid end each have a bottom support, however the crosshead guide support structure is left unsupported other than by compression due to tie-rod tension. This manner of support for a heavily loaded component (e.g., a crosshead guide support) during a forward stroke of the pumping operations is structurally inefficient and tends to have relatively high compliance and lack of rigidity, which can effectively limit the load rating of the overall pump.

The present disclosure is further directed or otherwise related to a structural support system of a positive displacement reciprocating pump, such as the pump 100 shown in FIG. 1, configured to increase rigidity, minimize deflections and twisting, and provide proper support for critically loaded components or portions of the pump in a structurally efficient design.

Figure 2:
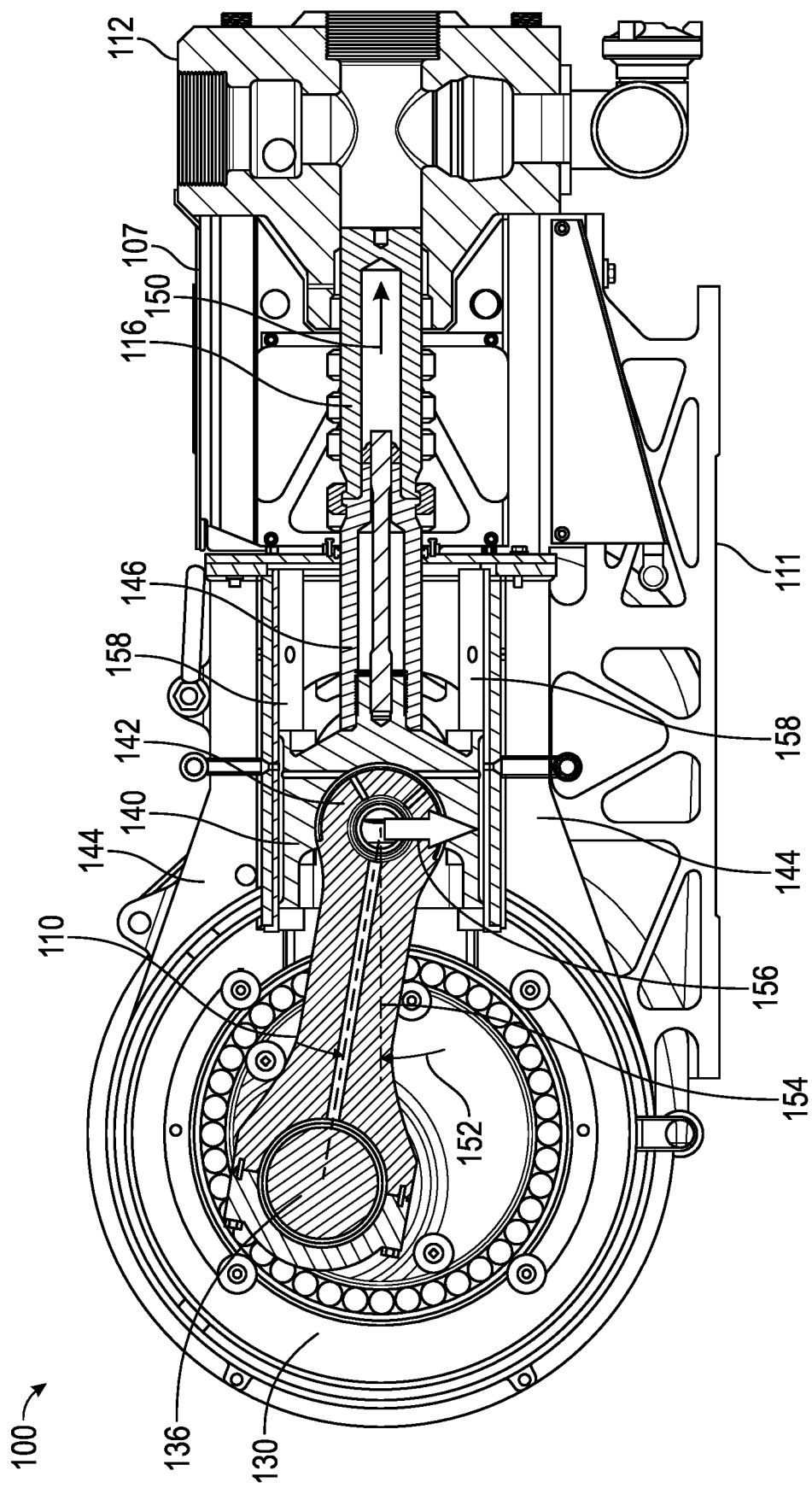
FIG. 2 is a sectional side view of an example implementation of the apparatus shown in FIG. 1.

FIG. 2 is a sectional side view of the pump 100 shown in FIG. 1 during a forward stroke of the pumping operations when the fluid-displacing member 116 (e.g., a plunger) is pushed forward at high fluid pressure, as indicated by arrow 150. The pump 100 is shown with the connecting rod 110 being pushed by the crankpin 136 while positioned at a maximum angle 152 with respect to a horizontal axis 154. At such angle 152, the connecting rod 110 can exert large downward force 156 on the crosshead 140 at the wristpin joint 142. This force 156 is transmitted downward to the support structure (e.g., frame 144, pump support base 111) for the crosshead guides 158 (e.g., crosshead guide bushings). For example, at a maximum connecting rod angle 152 of about fifteen degrees from horizontal axis 154, a connecting rod with a plunger 116 having a diameter of about fourteen centimeters (cm) and working at about 15,000 pounds per square inch (PSI) discharge pressure will have a compressive force of about 368,759 pounds and will exert a downward force of about 95,442 pounds at the crosshead 140.

Figure 3:
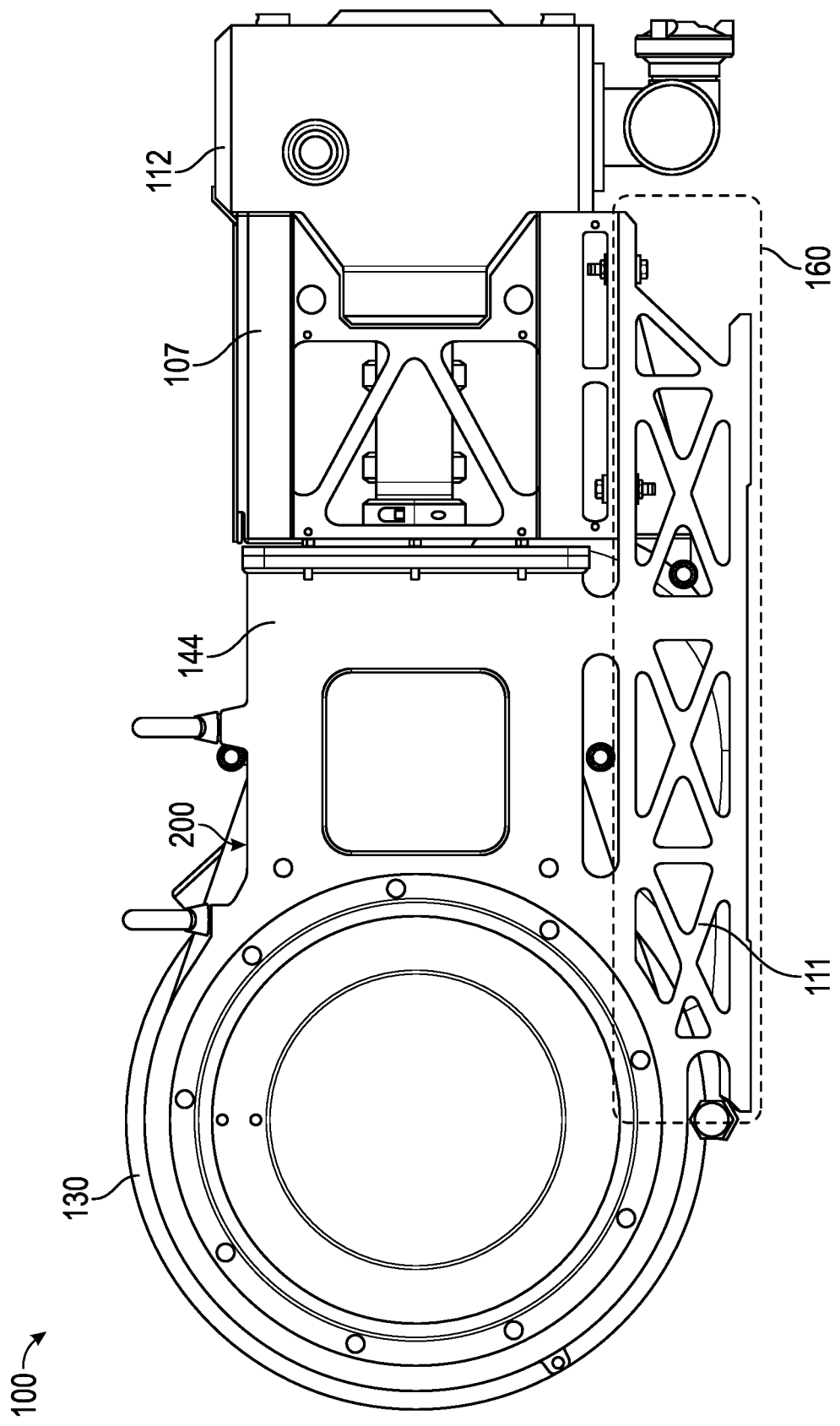
FIG. 3 is a side view of an example implementation of the apparatus shown in FIG. 1.
Figure 4:
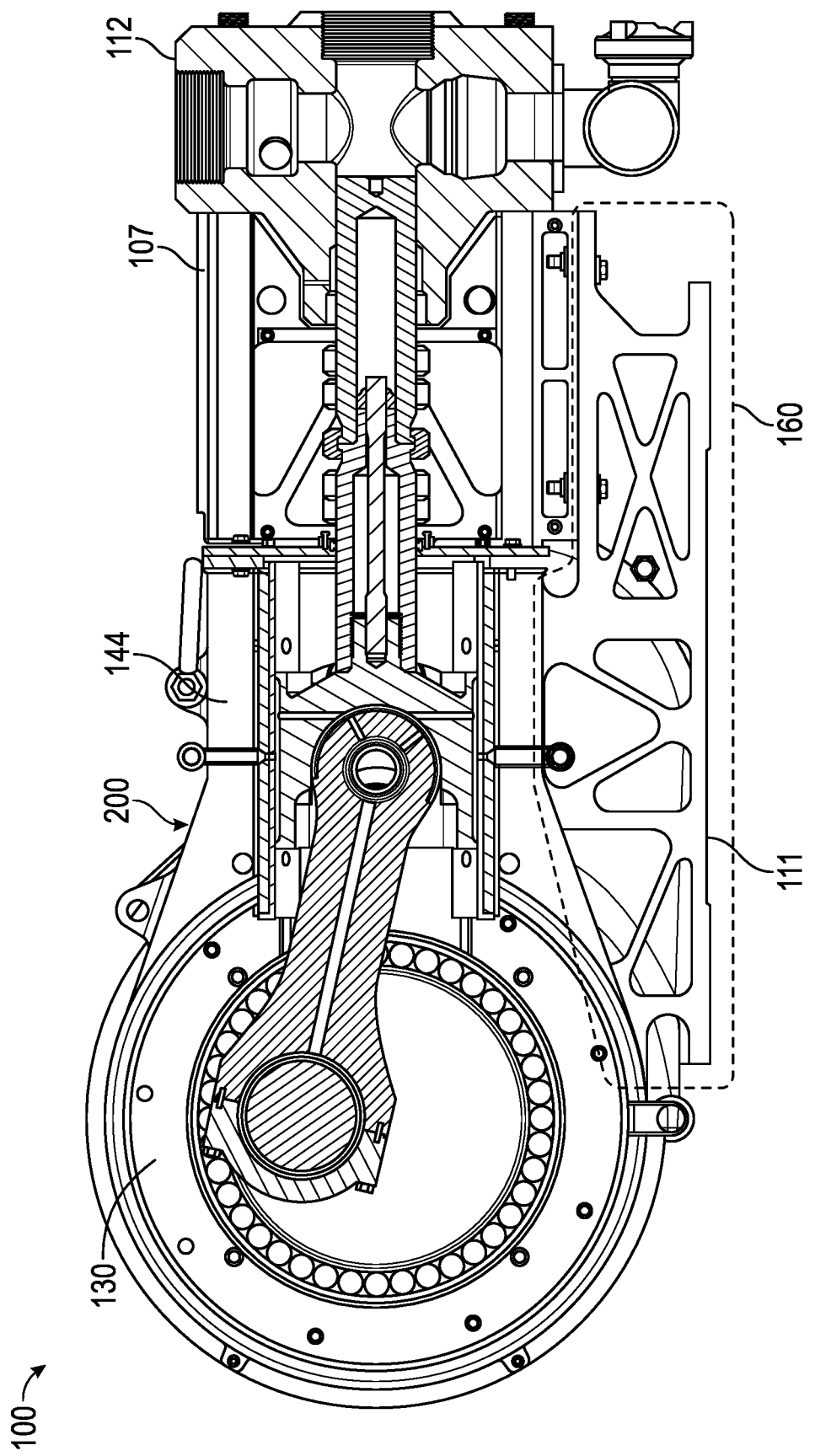
FIG. 4 is a sectional side view of an example implementation of the apparatus shown in FIG. 1.

FIGS. 3 and 4 are respective side and sectional side views of the pump shown in FIG. 1 according to one or more aspects of the present disclosure. The figures show a structurally-integrated crankcase frame 130, crosshead support frame 144, and pump support base 111. The pump support base 111 may comprise a pedestal portion 160 extending horizontally past or beyond the crosshead support frame 144 and below the spacer frame 107. The extended pedestal portion 160 may be configured as a base for supporting the spacer frame 107, which may rest on the pedestal portion 160. The spacer frame 107 may be fastened (e.g., bolted) or otherwise connected (e.g., welded) to the pedestal portion 160 of the pump support base 111 for increased rigidity. The support base 111 may be coupled (e.g., bolted) or otherwise connected (e.g., welded) to a base (not shown), such as a skid or mobile trailer, to fixedly connect the pump 100 to the base. Each of the integrated crankcase frame 130, the crosshead support frame 144, the pump support base 111, and the spacer frame 107 may be or form a portion of a pump structural support frame.

FIGS. 5-18 are views of various portions of a pump structural support frame 200 of the pump 100 shown in FIGS. 1-4 according to one or more aspects of the present disclosure. One or more of the various portions of the pump support frame 200 may comprise high-strength steel members (e.g., plates) that are machined to predetermined dimensions and with predetermined features. The steel members may be fixedly connected in a predetermined manner to collectively form the pump support frame 200 configured to increase rigidity, minimize deflections and twisting, and provide proper support for critically loaded components or portions of the pump 100 during pumping operations.

Figure 5:
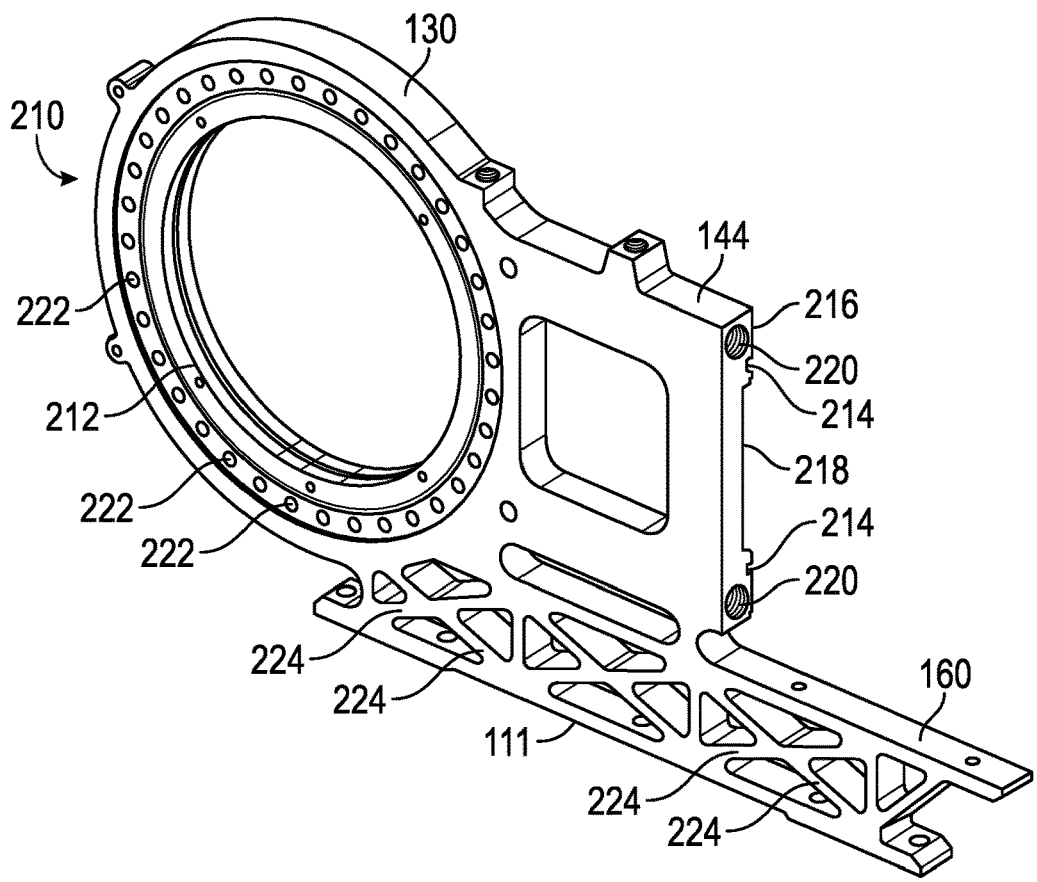
FIGS. 5-18 are views of various portions of the apparatus shown in FIGS. 1-4 according to one or more aspects of the present disclosure.
Figure 6:
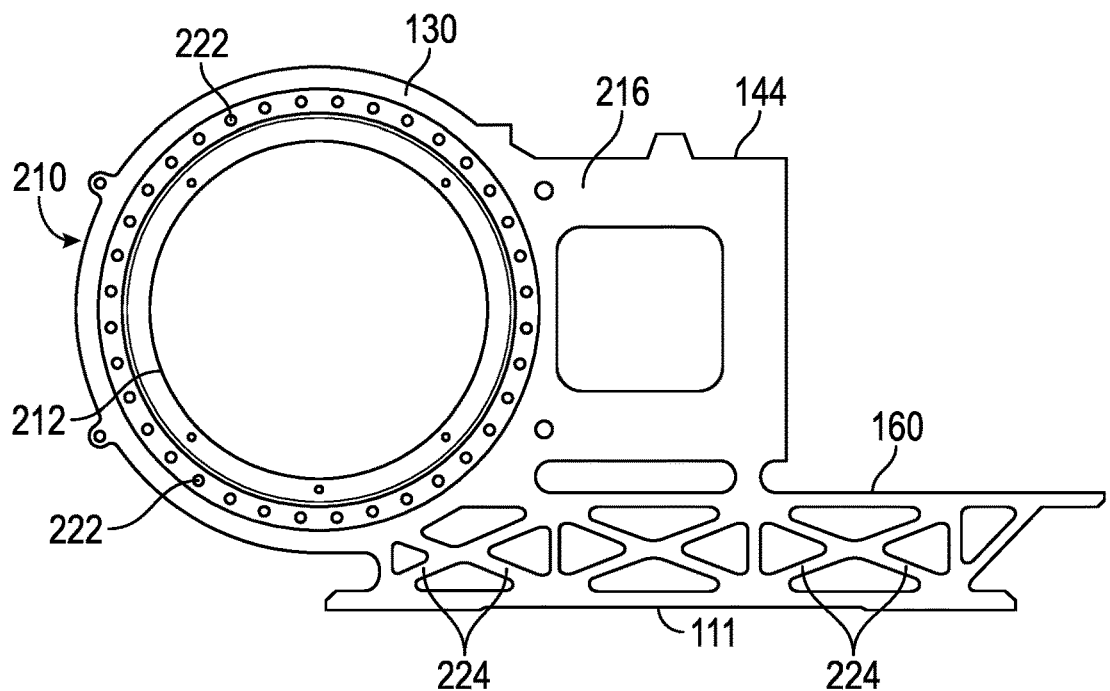

FIGS. 5 and 6 are perspective and side views, respectively, of an outboard structural member 210 of the pump support frame 200. The support frame 200 may comprise two outboard structural members 210, each forming an opposing side of the support frame 200. Each outboard structural member 210 may be or comprise a single-piece (e.g., integrally formed, unitary) member (e.g., plate) that is machined to predetermined dimensions and with predetermined features. Each outboard structural member 210 may be, form, or comprise a corresponding portion or segment of the crankcase frame 130, the crosshead support frame 144, and the pump support base 111, including the extended pedestal 160. Each outboard structural member 210 may further comprise an opening 212 for receiving the crankshaft bearing 134 and the crankshaft 132, threaded holes 222 for receiving fasteners for connecting a cover plate 213 (shown in FIG. 18), channels 214 along a sidewall 216 for receiving and mounting crosshead guide support members 160 (shown in FIG. 13), a cavity 218 along the sidewall 216 for receiving a crosshead 140 and crosshead guides 158, and threaded holes 220 for receiving tie-rods 105 (shown in FIGS. 1 and 18) that connect the pump housing 112 to the outboard structural member 210. The channels 214 and the cavity 218 may be a mirror image of channels 234 and cavity 238 shown in FIGS. 7 and 8. The threaded holes 220 may extend into or through at least a portion of the outboard structural member 210 forming the crosshead support frame 144. The support base 111 may be integrally formed or connected with the crankcase frame 130 and/or the crosshead support frame 144, and may comprise a lattice or mesh structural members 224 (e.g., beams) configured to facilitate strength and rigidity while reducing overall weight of the support base 111.

Figure 7:
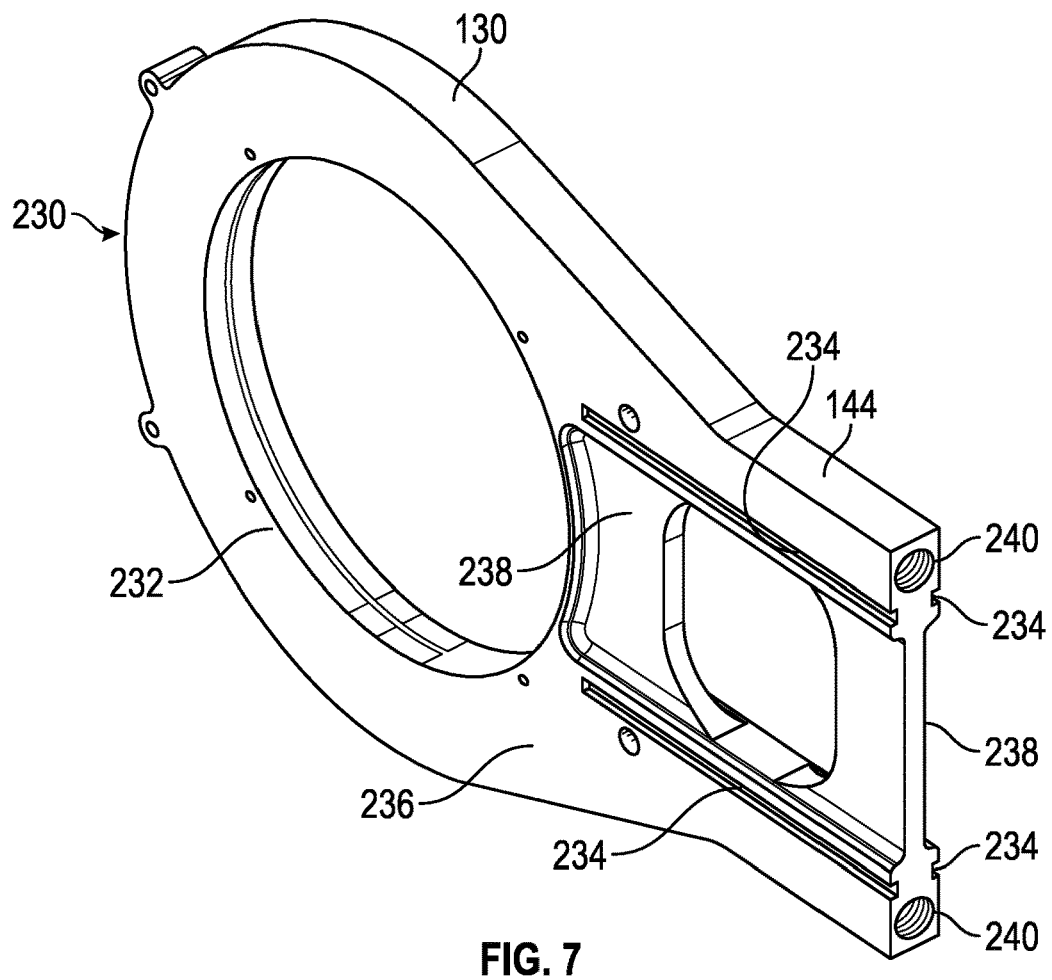
Figure 8:
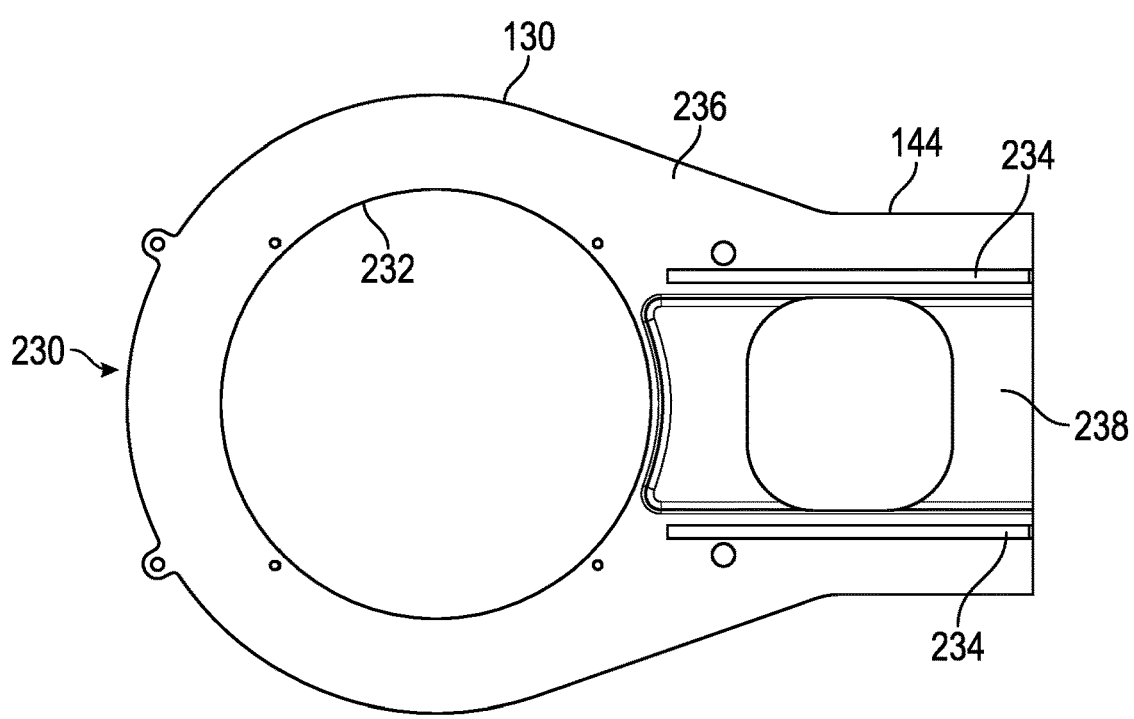

FIGS. 7 and 8 are perspective and side views, respectively, of an intermediate structural member 230 of the pump support frame 200. The support frame 200 may comprise a plurality (e.g., two, four, etc.) intermediate structural members 230 located between the outboard structural members 210 shown in FIGS. 5 and 6. Each intermediate structural member 230 may be or comprise a single-piece (e.g., integrally formed, unitary) member (e.g., plate) that is machined to predetermined dimensions and with predetermined features. Each intermediate structural member 230 may be, form, or comprise a corresponding portion or segment of the crankcase frame 130 and the crosshead support frame 144. Each intermediate structural member 230 may further comprise an opening 232 for receiving the crankshaft bearing 134 and the crankshaft 132, channels 234 along each opposing sidewall 236 for receiving and mounting crosshead guide support members 260 (shown in FIG. 13), a cavity 238 along each sidewall 236 for receiving a crosshead 140 and crosshead guides 158, and threaded holes 240 for receiving tie-rods 105 (shown in FIGS. 1 and 18) that connect the pump housing 112 to the intermediate structural member 230. The channels 234 and the cavity 238 on opposing sidewalls 236 may be mirror images of each other. The threaded holes 240 may extend into or through at least a portion of the intermediate structural member 230 forming the crosshead support frame 144.

Figure 9:
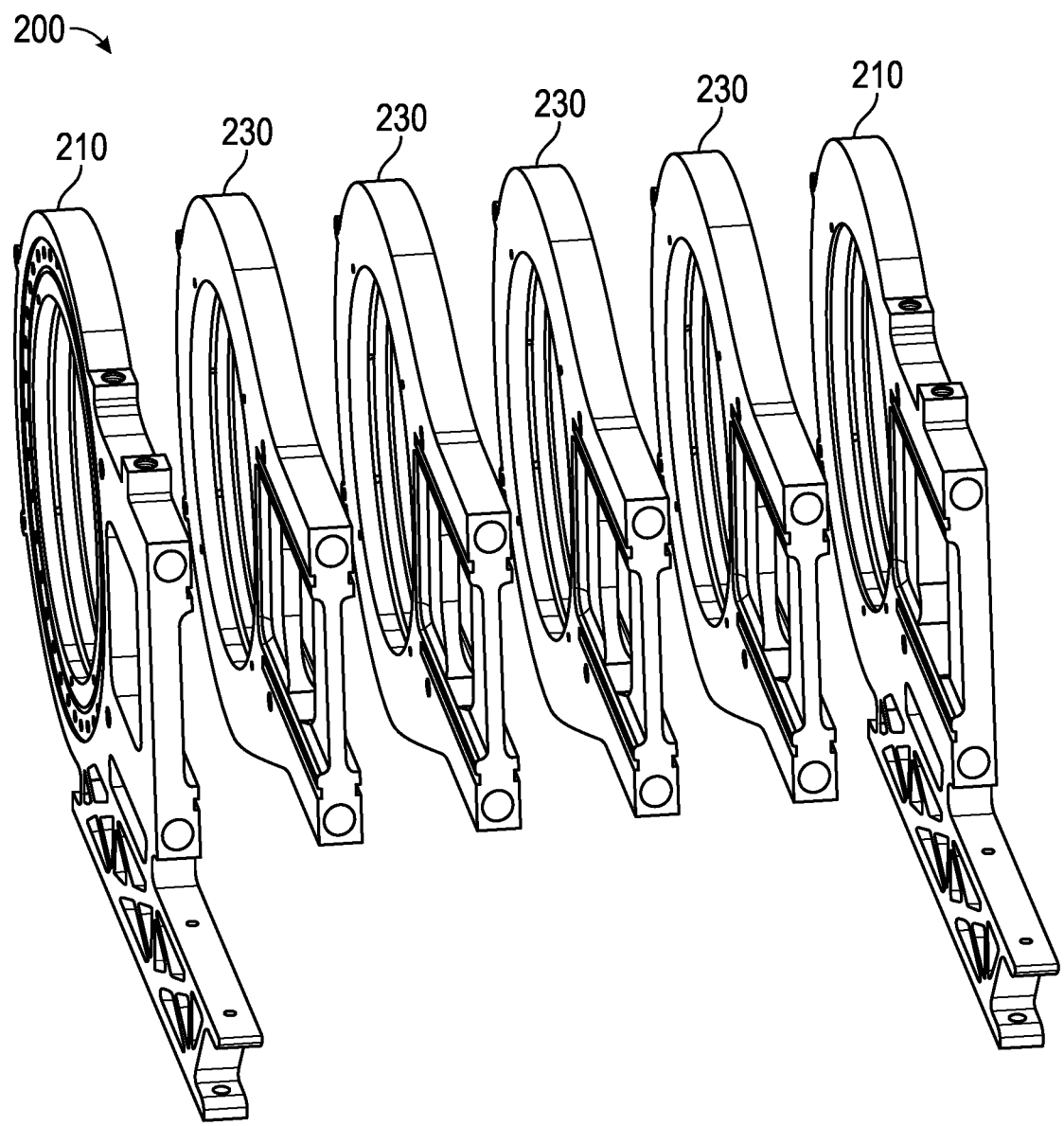

FIG. 9 is a perspective view of a portion of the pump support frame 200 showing just the outboard and intermediate structural members 210, 230 shown in FIGS. 5-8 aligned in parallel. The pump support frame 200 is shown implemented as a portion of a quintuplex pump comprising two outboard structural members 210 and four intermediate structural members 230 collectively operable to receive five crossheads 140 and crosshead guides 158 therebetween. A pump support frame within the scope of the present disclosure may instead be implemented as a portion of a triplex pump comprising two outboard structural members 210 and two intermediate structural members 230 collectively operable to receive three crossheads 140 and crosshead guides 158 therebetween. Other examples are also within the scope of the present disclosure.

Figure 10:
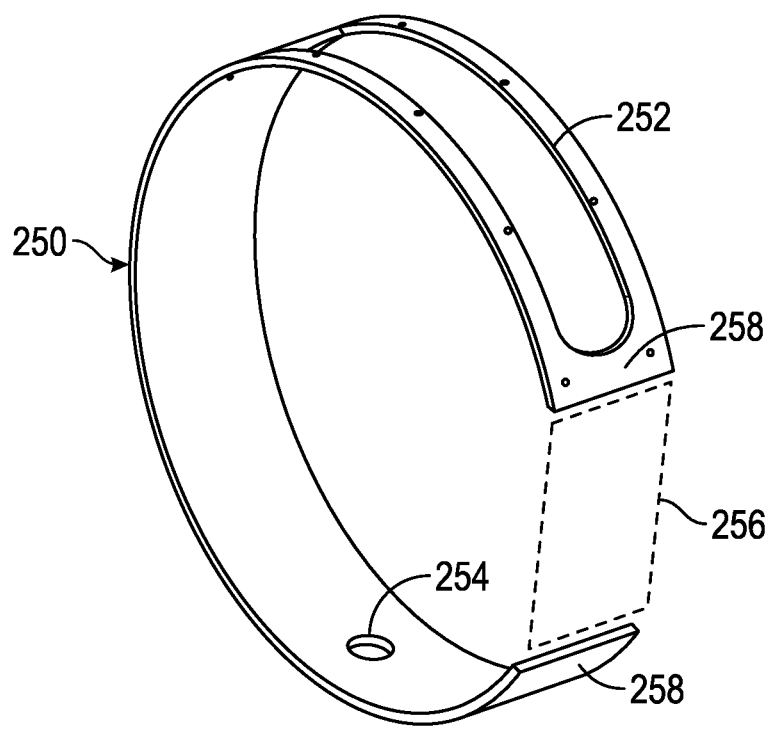
Figure 11:
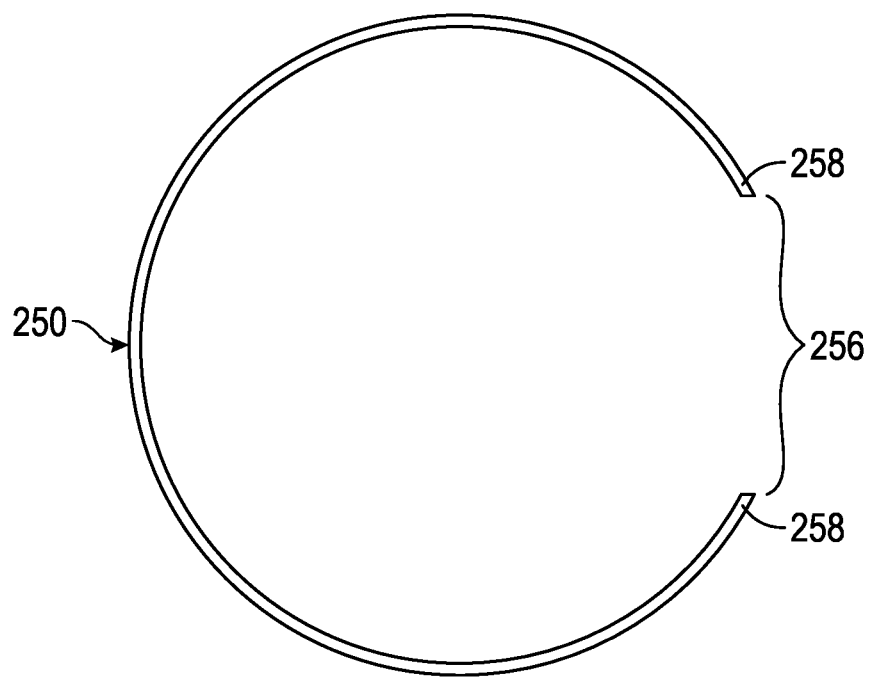

FIGS. 10 and 11 are perspective and side views, respectively, of a shell member 250 of the pump support frame 200. The support frame 200 may comprise a plurality (e.g., three, five, etc.) of the shell members 250, each located between adjacent outboard and/or intermediate structural members 210, 230 shown in FIGS. 5-8. Each shell member 250 may be, form, or comprise a corresponding portion (e.g., back shell of the crankcase structure) of the crankcase frame 130 for the rotational bearings 134 and the crankshaft 132. Each shell member 250 may be or comprise a single-piece (e.g., integrally formed, unitary) member (e.g., plate) that is shaped and machined to predetermined dimensions and with predetermined features. Each shell member 250 may have a C-shaped geometry and comprise an elongated cutout or opening 252 extending circumferentially along the shell member 250, a radial bore or opening 254 at a bottom of the shell member 250, and an open space or window 256 between opposing ends 258 of the shell member 250. The opening 252 may be utilized for accessing internal components of the crankcase 108, such as during installation or maintenance of the bearings 134. The opening 254 may be utilized for draining lubrication oil from the support frame 200. The window 256 may be configured to accommodate the connecting rod 110 and the crosshead 140 therethrough.

Figure 12:
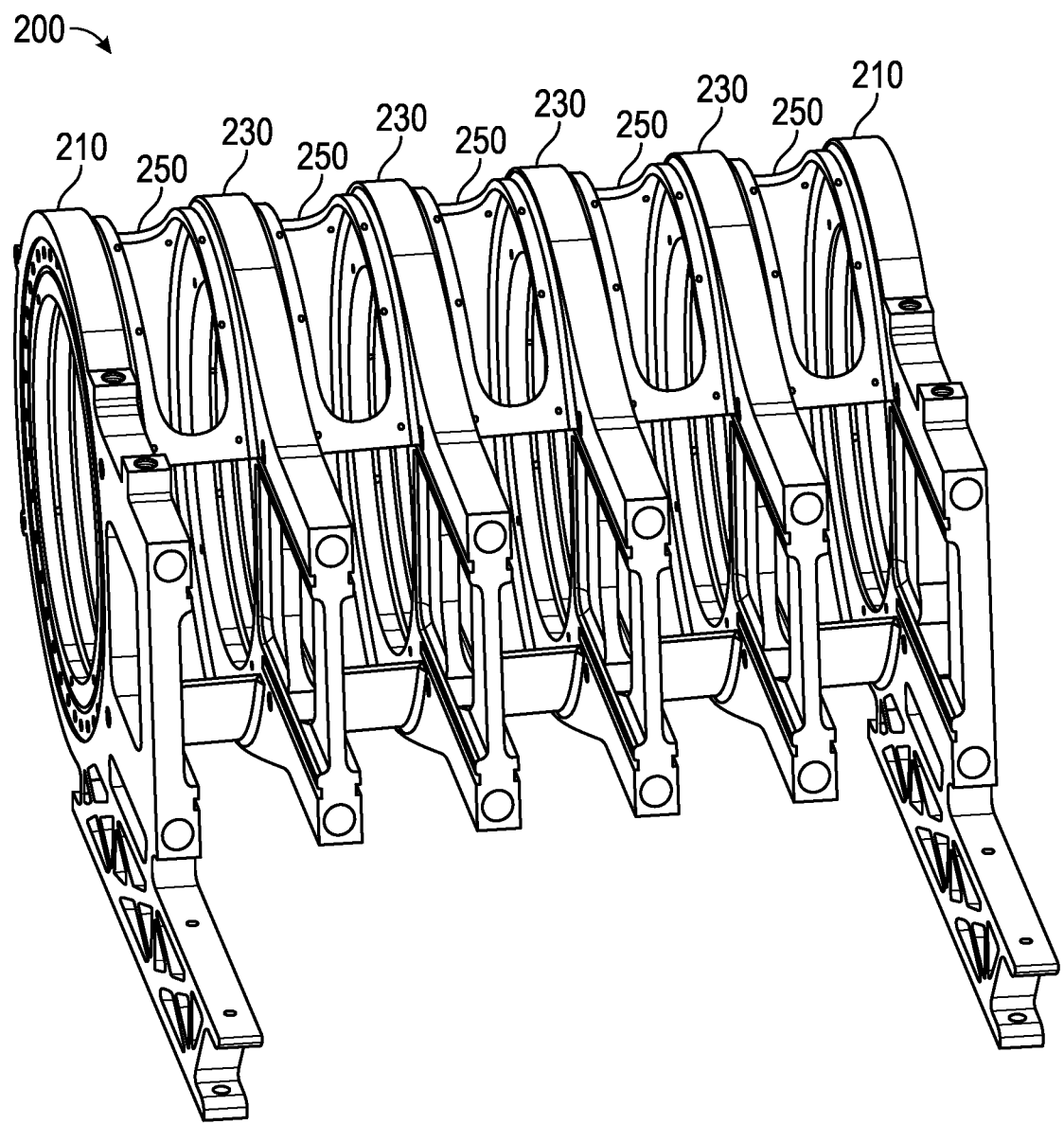

FIG. 12 is a perspective view of a portion of the pump support frame 200 showing the outboard and intermediate structural members 210, 230 shown in FIGS. 5-8 aligned in parallel and the shell members 250 shown in FIGS. 10 and 11 disposed between adjacent outboard and intermediate structural members 210, 230. Each shell member 250 may be welded or otherwise coupled to adjacent outboard and/or intermediate structural members 210, 230 to fixedly connect the outboard and intermediate structural members 210, 230 in parallel. Each shell member 250 may be welded or otherwise coupled around the opening 212, 232 of each outboard and intermediate structural member 210, 230 such that the window 256 of each shell member 250 is directed toward or aligned with the cavities 218, 238 of the outboard and intermediate structural members 210, 230.

Figure 13:
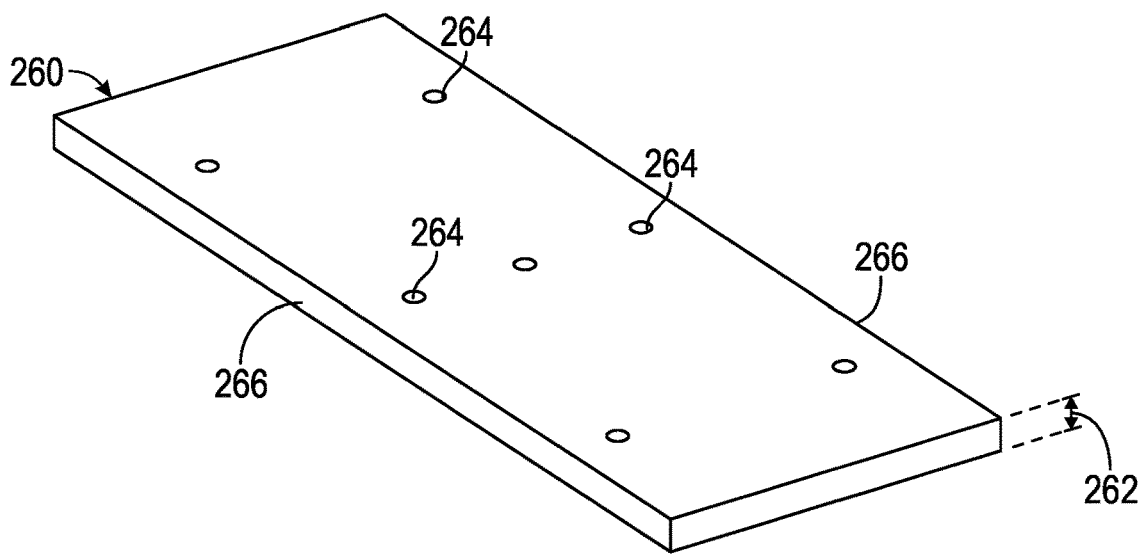

FIG. 13 is a perspective view of a crosshead support member 260 of the pump support frame 200. The support frame 200 may comprise a plurality (e.g., six, ten, etc.) of the support members 260, wherein a set of two support members 260 is located between adjacent outboard and/or intermediate structural members 210, 230 shown in FIGS. 5-8. Each crosshead support member 260 may be, form, or comprise a corresponding portion of the crosshead support frame 144 and, thus, may be configured to support and guide motion of a corresponding crosshead 140 during pumping operations. Each support member 260 may be or comprise a single-piece (e.g., integrally formed, unitary) member (e.g., plate) that is shaped and machined to predetermined dimensions and with predetermined features. Each support member 260 may have a rectangular geometry with a thickness 262 that facilitates structural support of a corresponding crosshead 140 during the forward pressurizing stroke of the pumping operations. Each support member 260 may comprise a plurality of openings 264 (e.g., threaded holes) configured to facilitate mounting a corresponding crosshead guide 158. Each long edge 266 of the support member 260 may be configured to be received by a corresponding channel 214, 234 of the outboard and intermediate structural members 210, 230.

Figure 14:
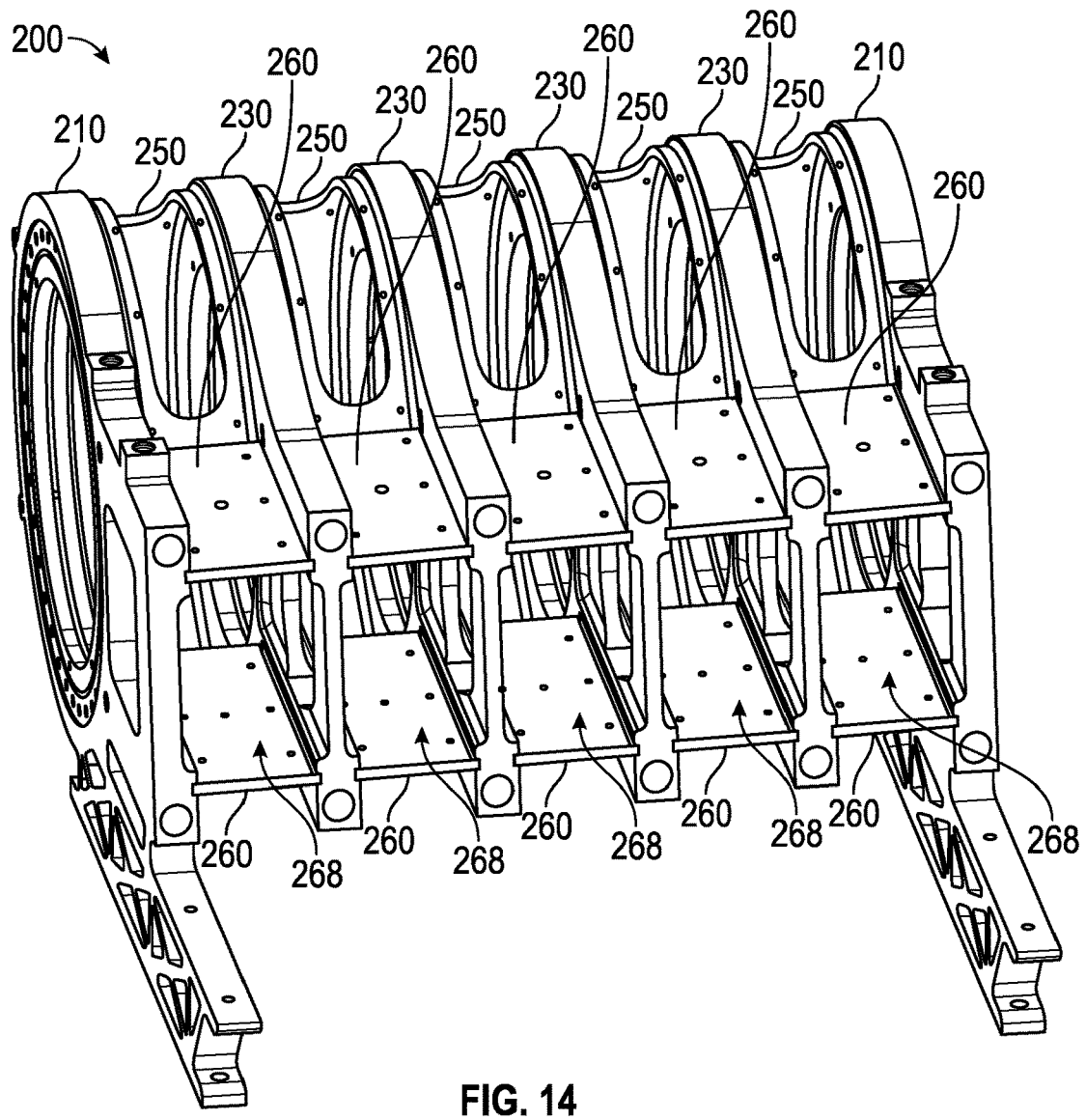

FIG. 14 is a perspective view of a portion of the pump support frame 200 showing the outboard and intermediate structural members 210, 230 shown in FIGS. 5-8 aligned in parallel, and the shell members 250 shown in FIGS. 10 and 11 and the crosshead support members 260 shown in FIG. 13 disposed and extending between adjacent outboard and intermediate structural members 210, 230. The long edge of each support member 260 may disposed within a corresponding channel 214, 234 of the outboard and/or intermediate structural members 210, 230. Each support member 260 may be welded or otherwise coupled to an adjacent outboard and/or intermediate structural member 210, 230 to fixedly connect the outboard and intermediate structural members 210, 230 in parallel. Each set of support members 260 and adjacent outboard and/or intermediate structural members 210, 230 may form a chamber 268 configured to accommodate therein opposing crosshead guides 158 and a crosshead 140.

Figure 15:
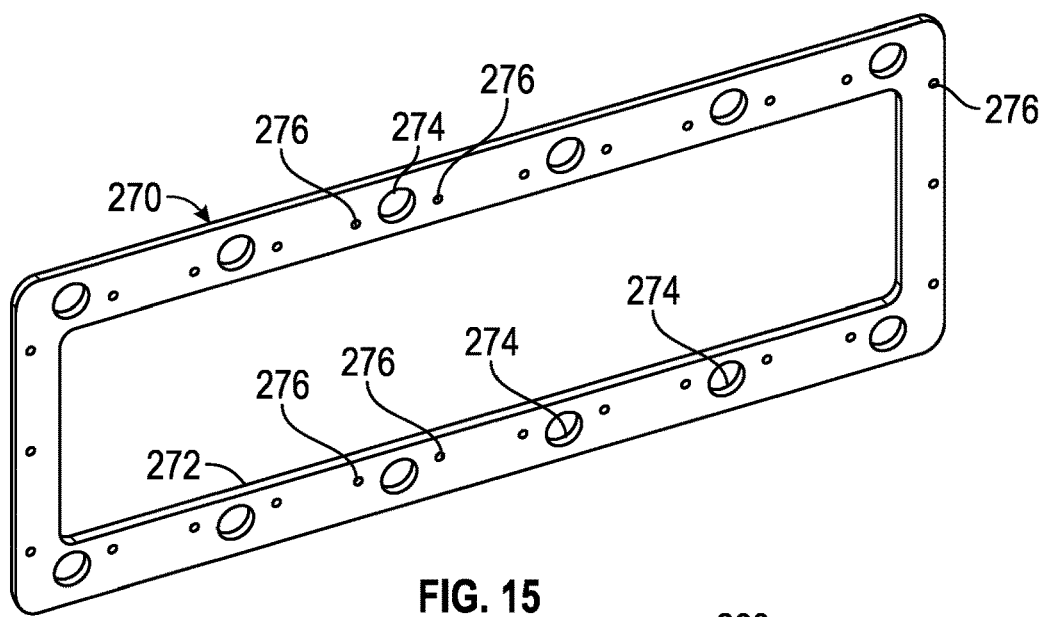

FIG. 15 is a perspective view of a face plate 270 of the pump support frame 200. The face plate 270 may be or comprise an end plate configured to be mounted at the ends of the outboard and/or intermediate structural members 210, 230 and the support members 260. The face plate 270 may be or comprise a single-piece (e.g., integrally formed, unitary) member that is shaped and machined to predetermined dimensions and with predetermined features. The face plate 270 may have a rectangular geometry and may comprise a generally rectangular cutout or opening 272 extending longitudinally along the face plate 270. The face plate 270 may further comprise a plurality of openings 274 (e.g., holes) for accommodating the tie-rods 105 therethrough. The face plate 270 may also comprise a plurality of openings 276 (e.g., holes) configured to facilitate mounting of a cover plate 271 (shown in FIG. 18) for enclosing the opening 272 and the chambers 268.

Figure 16:
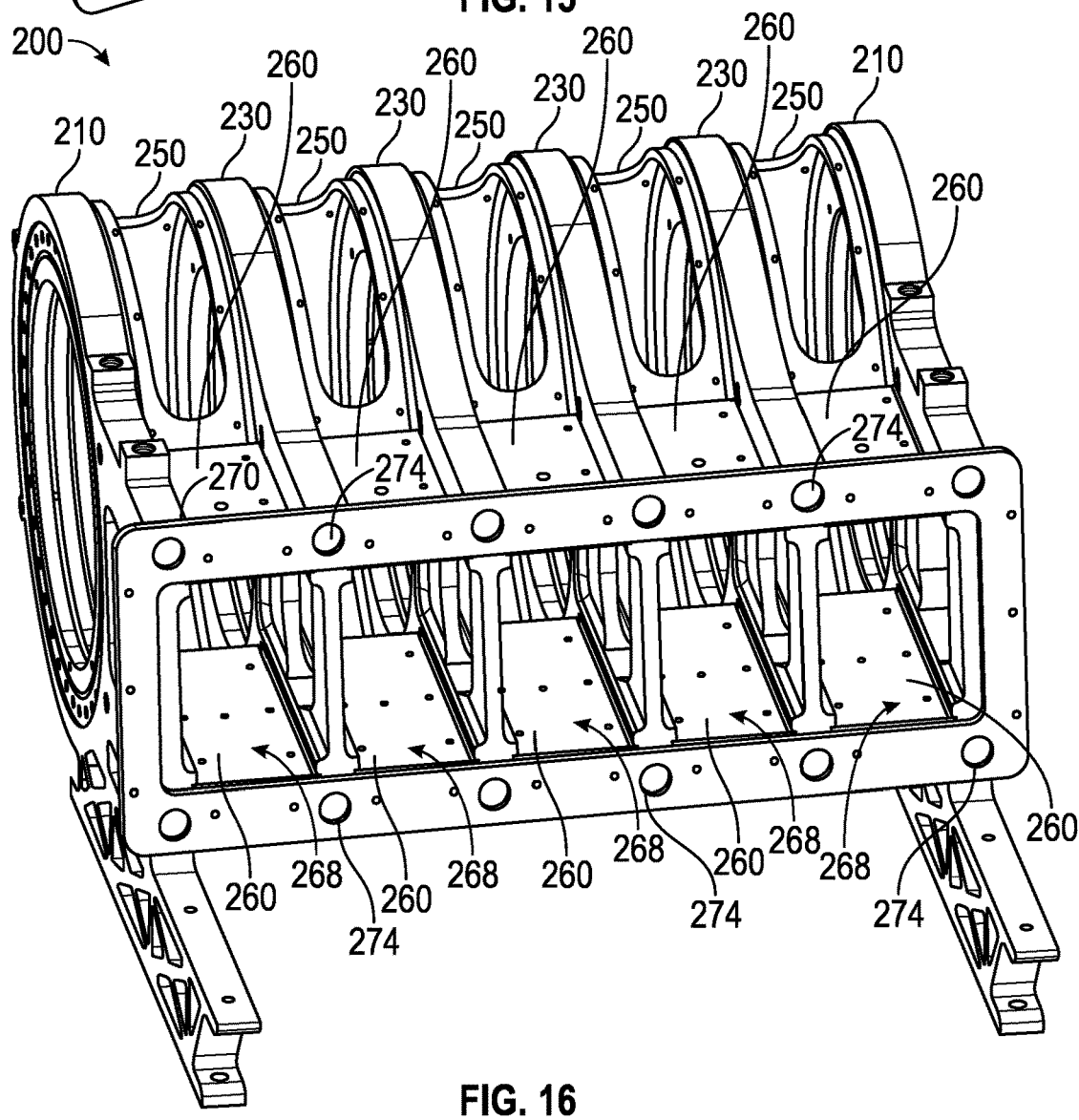

FIG. 16 is a perspective view of a portion of the pump support frame 200 showing the outboard and intermediate structural members 210, 230 shown in FIGS. 5-8 aligned in parallel, the shell members 250 shown in FIGS. 10 and 11 and the crosshead support members 260 shown in FIG. 13 disposed between adjacent outboard and intermediate structural members 210, 230, and the face plate 270. The face plate 270 may be welded or otherwise coupled with the ends of the outboard structural members 210, the intermediate structural members 230, and/or the support members 260, such that the opening 272 is aligned with openings of the chambers 268 and the openings 274 are aligned with the threaded holes 220, 240.

Figure 17:
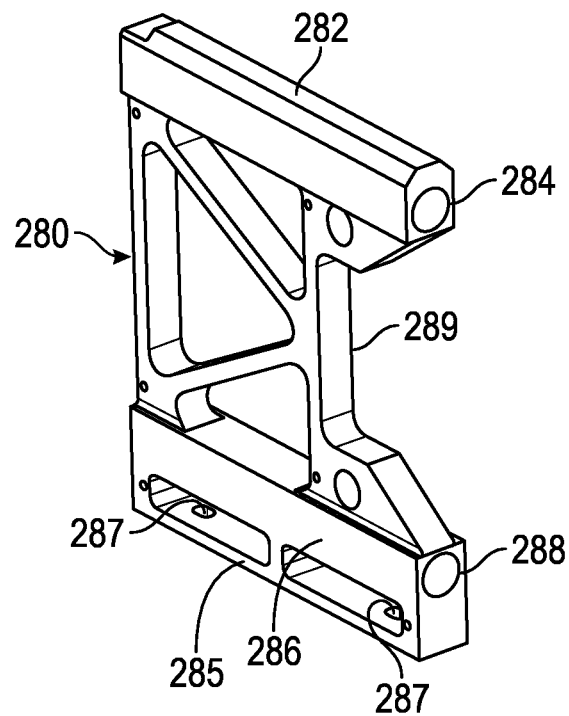

FIG. 17 is a perspective view of an outboard spacer member 280 of the pump support frame 200. The outboard spacer member 280 may be or form a portion of the spacer frame 107 shown in FIG. 1. The spacer frame 107 may comprise two outboard spacer members 280, each forming an opposing side of the spacer frame 107. Each outboard spacer member 280 may be or comprise a single-piece (e.g., integrally formed, unitary) member (e.g., plate) that is machined to predetermined dimensions and with predetermined features. Each outboard spacer member 280 may comprise an upper portion 282 (e.g., tube, tubular segment) having an upper bore 284 for accommodating therethrough a corresponding tie-rod 105, and a lower portion 286 (e.g., tube, tubular segment) having a lower bore 288 for accommodating therethrough a corresponding tie-rod 105. The upper and lower portions 282, 286 may be integrally formed or otherwise fixedly connected by structural members 289 arranged in a lattice or mesh configured to facilitate strength and rigidity while reducing overall weight of the outboard spacer member 280. Each outboard spacer member 280 may further comprise a connection portion or base 285 configured to facilitate connection (e.g., fastening, welding) of the outboard spacer member 280 to the pedestal portion 160 of the pump support base 111. For example, the connection base 285 may comprise a plurality of holes 287, each configured to receive a fastener (e.g., a bolt) to facilitate fastening of the outboard spacer member 280 to the pedestal portion 160 of the pump support base 111.

Figure 18:
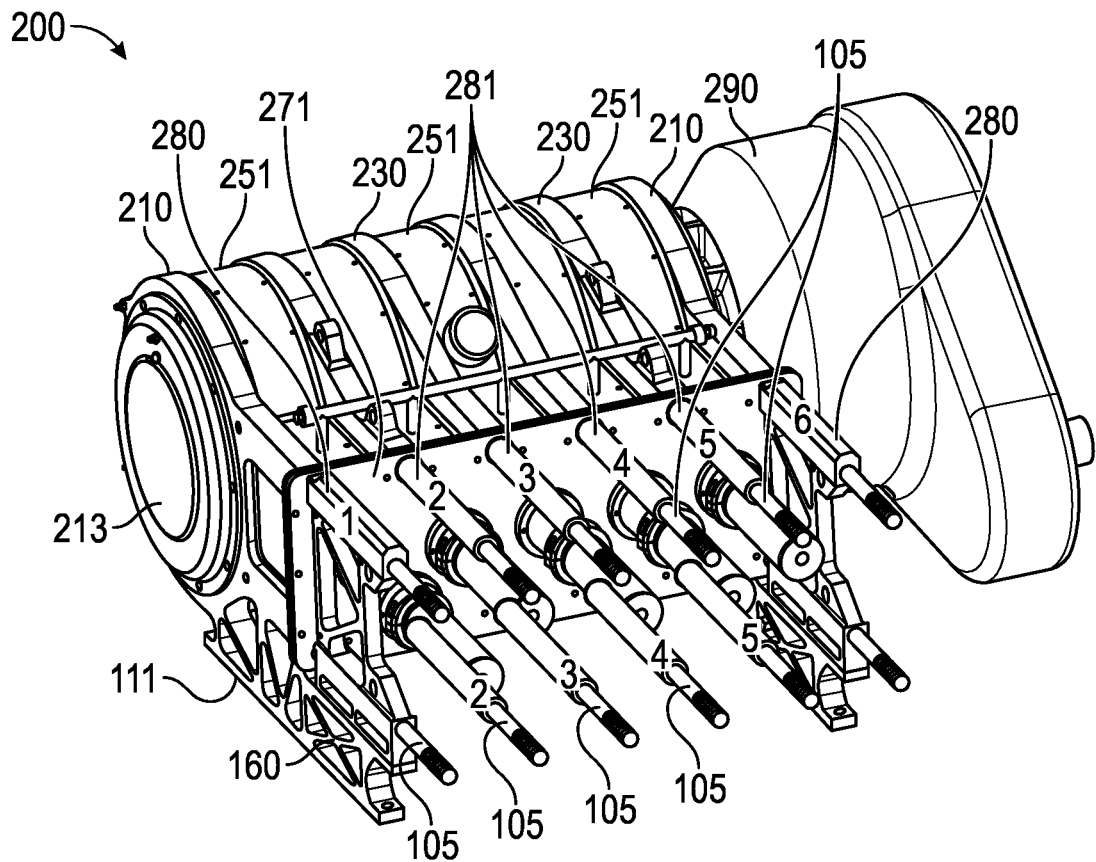

FIG. 18 is a perspective view of the pump support frame 200 shown in FIG. 16 and other portions of the pump 100 shown in FIGS. 1-4. The figure shows a plurality of covers 251 covering the openings 252 of the shell members 250. The figure shows a cover plate 213 enclosing the rotational bearings 134 and the crankshaft 132. The figure further shows a transmission 290 connected with the crankshaft 132 and the support frame 200. The figure further shows a cover plate 271 enclosing the opening 272 of the face plate 270 and the crosshead chambers 268. The figure also shows the spacer frame 107 comprising the outboard spacer members 280 and a plurality of intermediate spacer members 281 (e.g., tubes, tubular segments). Each intermediate spacer member 281 may comprise a bore configured for accommodating therethrough a corresponding tie-rod 105. The outboard spacer members 280 may be connected (e.g., fastened) to the pedestal portion 160 of the pump support base 111. Each tie-rod 105 may extend through a corresponding outboard and intermediate spacer member 280, 281 and threadedly engage a corresponding threaded hole 220, 240 of the outboard and intermediate structural members 210, 230 of the pump support frame 200.

Figure 19:
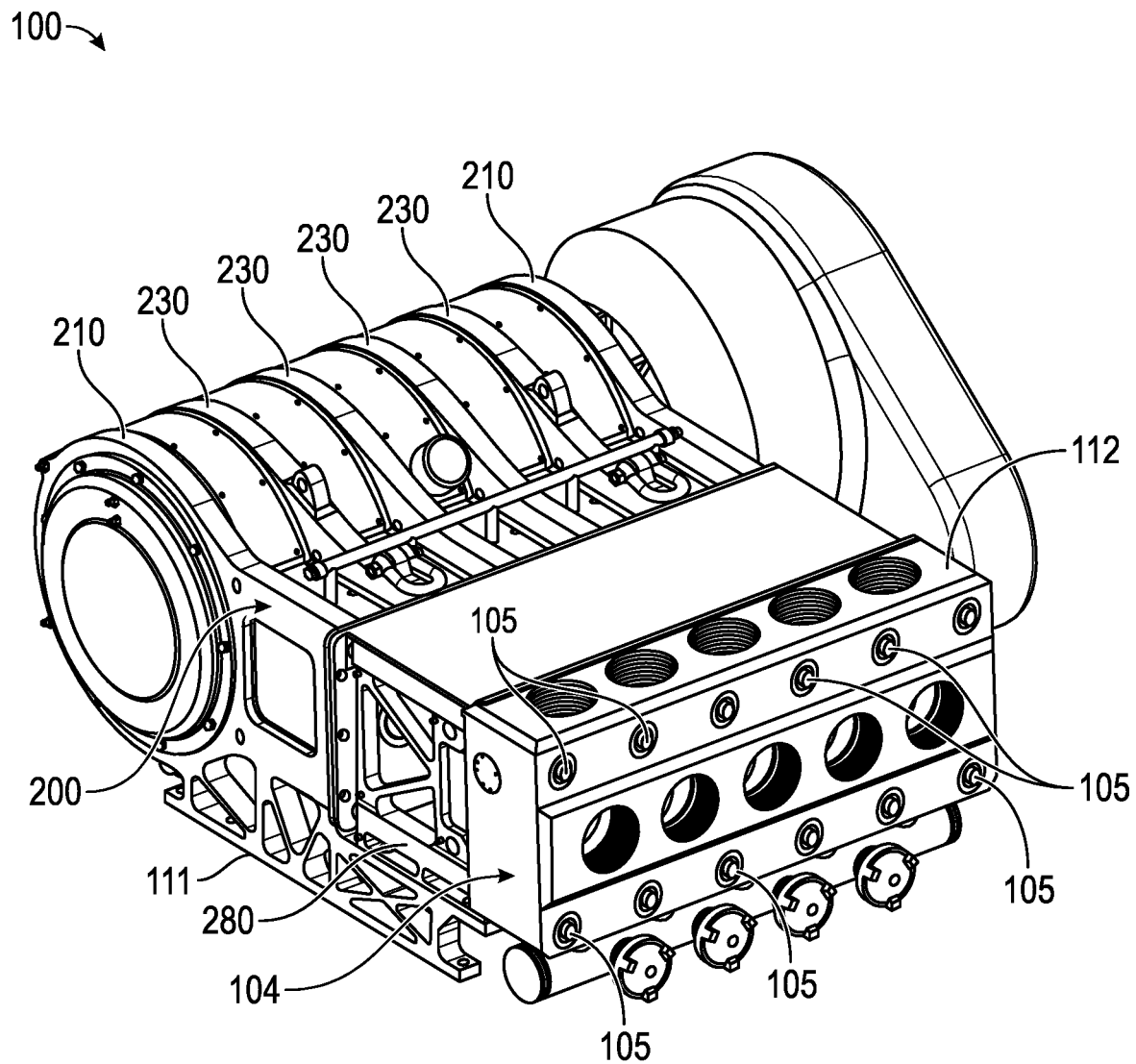
FIG. 19 is a perspective view of an example implementation of the apparatus shown in FIGS. 1-4.

FIG. 19 is a perspective view of at least a portion of the pump 100 shown in FIGS. 1-4. The pump 100 comprises the pump housing 112 of the pump section 104 coupled with the pump support frame 200 via a plurality of tie-rods 105. The tie-rods 105 may extend through the pump housing 112 and the outboard and intermediate spacer members 280, 281 and may connect with the outboard and intermediate structural members 210, 230 of the pump support frame 200.

In view of the entirety of the present disclosure, including the figures and the claims, a person having ordinary skill in the art will readily recognize that the present disclosure introduces an apparatus comprising a reciprocating pump comprising a power end, a fluid end, and a spacer section interposing the power and fluid ends, wherein the power end comprises a structural support frame comprising a plurality of structural members that are each a discrete, unitary member, and wherein each structural member forms: a portion of a crankcase frame; a portion of a crosshead support frame; and a portion of a support base, wherein the support base portion extends beneath the crosshead support frame and the spacer section.

The spacer section may comprise a spacer frame fastened to the support base.

The spacer section may be vertically supported by direct contact with the support base.

The structural members may be first structural members, the structural support frame may further comprise a plurality of second structural members that are each a discrete, unitary member, and each second structural member may form a portion of the crankcase frame and a portion of the crosshead support frame but not the support base. The first and second structural support members may be collectively connected in parallel.

The support base may be configured to connect the pump to a base structure.

The spacer section may comprise a spacer frame comprising a plurality of spacer members each disposed between the fluid end and the crosshead support frame. The reciprocating pump may further comprise a plurality of tie rods each connecting a corresponding one of the spacer members to the crosshead support frame. Each tie rod may extend through a bore in the corresponding spacer member. At least two of the spacer members may be fastened to the support base. At least two of the spacer members may be fastened to the support base.

The structural members may be first structural members, the structural support frame may further comprise a plurality of second structural members, and each second structural member may be a discrete, unitary member. Each second structural member may form a portion of the crankcase frame and a portion of the crosshead support frame but not the support base, and the spacer section may comprise a spacer frame comprising a plurality of spacer members each disposed between the fluid end and a corresponding one of the first and second structural members. The reciprocating pump may further comprise a plurality of tie rods each connecting a corresponding one of the spacer members to the corresponding one of the first and second structural members. At least two of the spacer members may be fastened to the support base. Outboard ones of the spacer members may each be fastened to a portion of the corresponding first structural member that forms the support base.

The present disclosure also introduces an apparatus comprising a reciprocating pump comprising a power end, a fluid end, and a spacer section interposing the power and fluid ends, wherein the power end comprises: a crankcase portion comprising a crankcase frame and a plurality of crankshafts each extending from the crankcase frame; a crosshead portion comprising a crosshead support frame and a plurality of crossheads each pivotably connected with a corresponding one of the crankshafts; and a structural support frame comprising a plurality of structural members that are each a discrete, unitary member. Each structural member forms: a portion of the crankcase frame; a portion of the crosshead support frame; and a portion of a support base, wherein the support base portion extends horizontally below the entire crosshead support portion and the spacer frame.

The spacer section may comprise a spacer frame fastened to the support base.

The spacer section may be vertically supported by direct contact with the support base.

The structural members may be first structural members and the structural support frame may further comprise a plurality of second structural members that are each a discrete, unitary member. Each second structural member may form a portion of the crankcase frame and a portion of the crosshead support frame but not the support base. The spacer section may comprise a spacer frame comprising a plurality of spacer members each disposed between the fluid end and a corresponding one of the first and second structural members, the reciprocating pump may further comprise a plurality of tie rods each connecting a corresponding one of the spacer members to the corresponding one of the first and second structural members, and at least two of the spacer members may be fastened to portions of the corresponding first structural members that form the support base.

The present disclosure also introduces an apparatus comprising a reciprocating pump comprising a power end, a fluid end, and a spacer section interposing the power and fluid ends. The power end comprises: a crankcase portion comprising a crankcase frame and a plurality of crankshafts each protruding from the crankcase frame; a crosshead portion comprising a crosshead support frame and a plurality of crossheads each pivotably connected with an end of a corresponding one of the crankshafts protruding from the crankcase frame; and a structural support frame comprising a plurality of first structural members and a plurality of second structural members. The plurality of first structural members are each a discrete, unitary member. Each first structural member forms: a portion of the crankcase frame; a portion of the crosshead support frame; and a portion of a support base, wherein the support base portion extends horizontally below the entire crosshead support portion and the spacer frame, and wherein the spacer section is fastened to or otherwise vertically supported by the support base. The plurality of second structural members are each a discrete, unitary member. Each second structural member forms a portion of the crankcase frame and a portion of the crosshead support frame but not the support base.

The present disclosure also introduces an apparatus comprising a reciprocating pump comprising: a structural support frame comprising a crankshaft support portion and a crosshead support portion; a crankshaft supported by the crankshaft support portion; and a plurality of crossheads operatively connected with the crankshaft, wherein the crossheads are supported by the crosshead support portion, and wherein the crankshaft support portion and the crosshead support portion are integrally formed.

The crosshead support portion may inhibit vertical motion and permit horizontal motion of the crossheads during pumping operation.

The structural support frame may comprise a plurality of structural support members each comprising a segment of the crankshaft support portion and crosshead support portion, and each structural support member may be integrally formed. The structural support members may be connected in parallel. The reciprocating pump may comprise a plurality of support plates each extending between adjacent ones of the structural support members, and each plate may support a corresponding crosshead during pumping operation.

The reciprocating pump may comprise a support base configured to connect the reciprocating pump to a base structure, and the support base may be connected to the crankshaft support portion and the crosshead support portion. The support base, the crankshaft support portion, and the crosshead support portion may be integrally formed. The structural support frame may comprise a plurality of structural support members, and at least two of the structural support members may comprise a segment of the crankshaft support portion, the crosshead support portion, and the support base. The reciprocating pump may comprise: a fluid end; and a spacer frame disposed between the fluid end and the structural support frame, wherein the spacer frame is fastened to the support base. The support base may extend horizontally past the crosshead support portion and below the spacer frame. The spacer frame may comprise a plurality of spacer members each disposed between the fluid end and the structural support frame, each spacer member may comprise a bore configured for accommodating therethrough a corresponding tie rod, and at least two of the spacer members may be fastened to the support base.

The reciprocating pump may comprise: a fluid end; and a spacer frame disposed between the fluid end and the structural support frame, wherein the spacer frame may comprise a plurality of spacer members each disposed between the fluid end and the structural support frame, and each spacer member may comprise a bore configured for accommodating therethrough a corresponding tie rod.

The reciprocating pump may comprise: a fluid end; and a plurality of tie rods connecting the fluid end with the structural support frame, wherein the crosshead support portion may comprise a plurality of threaded holes, and wherein each of the tie rods may threadedly engage a corresponding one of the threaded holes.

The present disclosure also introduces an apparatus comprising a reciprocating pump comprising: a structural support frame comprising a crankshaft support portion, a crosshead support portion, and a plurality of structural support members each comprising a segment of the crankshaft support portion and crosshead support portion, wherein each structural support member is integrally formed; a crankshaft supported by the crankshaft support portion; and a plurality of crossheads operatively connected with the crankshaft, wherein the crossheads are supported by the crosshead support portion.

The crosshead support portion may inhibit vertical motion and permit horizontal motion of the crossheads during pumping operation.

The structural support members may be connected in parallel.

The reciprocating pump may comprise a plurality of support plates each extending between adjacent ones of the structural support members, and each plate may support a corresponding crosshead during pumping operation.

The reciprocating pump may comprise a support base configured to connect the reciprocating pump to a base structure, and at least two of the structural support members may comprise a segment of the support base. The reciprocating pump may comprise: a fluid end; and a spacer frame disposed between the fluid end and the structural support frame, wherein the spacer frame may be fastened to the support base. The support base may extend horizontally past the crosshead support portion and below the spacer frame. The spacer frame may comprise a plurality of spacer members each disposed between the fluid end and the structural support frame, wherein each spacer member may comprise a bore configured for accommodating therethrough a corresponding tie rod, and wherein at least two of the spacer members may be fastened to the support base.

The reciprocating pump may comprise: a fluid end; and a spacer frame disposed between the fluid end and the structural support frame, wherein the spacer frame may comprise a plurality of spacer members each disposed between the fluid end and the structural support frame, and wherein each spacer member may comprise a bore configured for accommodating therethrough a corresponding tie rod.

The reciprocating pump may comprise: a fluid end; and a plurality of tie rods connecting the fluid end with the structural support frame, wherein the crosshead support portion may comprise a plurality of threaded holes, and wherein each of the tie rods may threadedly engage a corresponding one of the threaded holes.

The present disclosure also introduces an apparatus comprising a reciprocating pump comprising: a structural support frame comprising a crankshaft support portion, a crosshead support portion, a support base configured to connect the reciprocating pump to a base structure, and a plurality of structural support members each comprising a segment of the crankshaft support portion and the crosshead support portion, wherein at least two of the structural support members further comprise a segment of the support base, and wherein each structural support member is integrally formed; a crankshaft supported by the crankshaft support portion; a plurality of crossheads operatively connected with the crankshaft, wherein the crossheads are supported by the crosshead support portion; a fluid end; and a spacer frame disposed between the fluid end and the structural support frame, wherein the spacer frame is supported by the support base.

The foregoing outlines various features so that a person having ordinary skill in the art may better understand the aspects of the present disclosure. A person having ordinary skill in the art should appreciate that they may readily use the present disclosure as a basis for designing or modifying other processes and structures for carrying out the same purposes and/or achieving the same advantages of the implementations introduced herein. A person having ordinary skill in the art should also realize that such equivalent constructions do not depart from the scope of the present disclosure, and that they may make various changes, substitutions, and alterations herein without departing from the spirit and scope of the present disclosure.

The Abstract at the end of this disclosure is provided to permit the reader to quickly ascertain the nature of the technical disclosure. It is submitted with the understanding that it will not be used to interpret or limit the scope or meaning of the claims.

What is claimed is:

1. An apparatus comprising: a reciprocating pump comprising a power end, a fluid end, and a spacer section interposing the power and fluid ends, wherein the power end comprises a structural support frame comprising: first and second outboard structural members that are each a discrete, unitary member, and wherein the first and second outboard structural members form: respective portions of a crankcase frame; respective portions of a crosshead support frame; and respective portions of a support base, wherein the first and second outboard structural members comprise respective first and second pedestal portions extending beneath at least a part of the crankcase frame, an entirety of the crosshead support frame, and at least a part of the spacer section, wherein the first and second pedestal portions comprise a lattice structure extending from directly beneath the crankcase frame to directly beneath the spacer section and are configured to be fixedly coupled to a base structure; and a plurality of inboard structural members that are each a discrete, unitary member, wherein each of the plurality of inboard structural members is interposed between the first and second outboard structural members, and wherein the plurality of inboard structural members forms respective additional portions of the crankcase frame and respective additional portions of the crosshead support frame, but not the support base.

2. The apparatus of claim 1, wherein the spacer section comprises a spacer frame fastened to the support base.

3. The apparatus of claim 1, wherein the spacer section is vertically supported by direct contact with the support base.

4. The apparatus of claim 1, wherein the first and second outboard structural members and the plurality of inboard structural members are collectively connected in parallel.

5. The apparatus of claim 1, wherein the spacer section comprises a spacer frame comprising a plurality of spacer members, each of the plurality of spacer members disposed between the fluid end and the crosshead support frame.

6. The apparatus of claim 5, wherein the reciprocating pump further comprises a plurality of tie rods, each of the plurality of tie rods connecting a corresponding spacer member to the crosshead support frame.

7. The apparatus of claim 6, wherein each tie rod of the plurality of tie rods extends through a bore in the corresponding spacer member.

8. The apparatus of claim 6, wherein at least two spacer members of the plurality of spacer members are fastened to the support base.

9. The apparatus of claim 5, wherein at least two spacer members of the plurality of spacer members are fastened to the support base.

10. The apparatus of claim 1, wherein:
the spacer section comprises a spacer frame comprising a plurality of spacer members, each of the plurality of spacer members disposed between the fluid end and a corresponding inboard structural member of the plurality of inboard structural members.

11. The apparatus of claim 10, wherein the reciprocating pump further comprises a plurality of tie rods connecting the plurality of spacer members to the plurality of inboard structural members.

12. The apparatus of claim 11, wherein at least two spacer members of the plurality of spacer members are fastened to the support base.

13. The apparatus of claim 10, wherein the spacer members comprise outboard spacer members and inboard spacer members interposed between the outboard spacer members and wherein the outboard spacer members are each fastened to the portion of the corresponding first and second outboard structural member that forms the support base.

14. The apparatus of claim 1, further comprising a plurality of shell members, each of the plurality of shell members interposed between the first and second outboard structural members forming a corresponding portion of a back shell of the crankcase frame.

15. An apparatus comprising: a reciprocating pump comprising a power end, a fluid end, and a spacer section interposing the power and fluid ends, wherein the power end comprises: a crankcase comprising a crankcase frame and a plurality of crankshafts each extending from the crankcase frame; a crosshead comprising a crosshead support frame and a plurality of crossheads, each of the plurality of crossheads pivotably connected with a corresponding crankshaft of the plurality of crankshafts; and a structural support frame comprising first and second outboard structural members that are each a discrete, unitary member, wherein each of the first and second outboard structural members form: respective portions of the crankcase frame; respective portions of the crosshead support frame; and respective portions of a support base, wherein the first and second outboard structural members comprise respective first and second pedestal portions extending horizontally below at least a part of the crankcase frame, an entirety of the crosshead support frame and at least a part of the spacer section, wherein the first and second pedestal portions comprise a lattice structure extending from directly beneath the crankcase frame to directly beneath the spacer section and are configured to be fixedly coupled to a base structure, and wherein the structural support frame further comprises a plurality of inboard structural members that are each a discrete, unitary member, and wherein each of the plurality of inboard structural members is interposed between the first and second outboard structural members, and the plurality of inboard structural members forms respective additional portions of the crankcase frame and respective additional portions of the crosshead support frame, but not the support base.

16. The apparatus of claim 15, wherein the spacer section comprises a spacer frame fastened to the support base.

17. The apparatus of claim 15, wherein the spacer section is vertically supported by direct contact with the support base.

18. The apparatus of claim 15, wherein:
the spacer section comprises a spacer frame comprising a plurality of spacer members each of the plurality of spacer members disposed between the fluid end and a corresponding inboard structural member of the plurality of inboard structural members;
the reciprocating pump further comprises a plurality of tie rods each of the plurality of tie rods connecting a corresponding spacer member to the corresponding one of the plurality of inboard structural members; and
at least two spacer members of the plurality of spacer members are fastened to the portions of the corresponding first and second outboard structural members that form the support base.

19. An apparatus comprising: a reciprocating pump comprising a power end, a fluid end, and a spacer section interposing the power and fluid ends, wherein the power end comprises: a crankcase comprising a crankcase frame and a plurality of crankshafts each protruding from the crankcase frame; a crosshead comprising a crosshead support frame and a plurality of crossheads each pivotably connected with an end of a corresponding one of the crankshafts protruding from the crankcase frame; and a structural support frame comprising: first and second outboard structural members that are each a discrete, unitary member, wherein the first and second outboard structural members form: respective portions of the crankcase frame; respective portions of the crosshead support frame; and respective portions of a support base, wherein the first and second outboard structural members comprise respective first and second pedestal portions extending horizontally below at least a part of the crankcase frame, an entirety of the crosshead support frame and at least a part of the spacer frame, wherein the first and second pedestal portions comprise a lattice structure extending from directly beneath the crankcase frame to directly beneath the spacer section and are configured to be fixedly coupled to a base structure, and wherein the spacer frame is fastened to or vertically supported by the support base; and a plurality of inboard structural members that are each a discrete, unitary member and interposed between the first and second outboard structural members, wherein the plurality of inboard structural members forms respective additional portions of the crankcase frame and respective additional portions of the crosshead support frame, but not the support base.

* * * * *